United States Patent [19]

Benjamino et al.

[11] Patent Number: 5,231,809
[45] Date of Patent: Aug. 3, 1993

[54] SCREEN DOOR ENTRY SYSTEM

[75] Inventors: Michael J. Benjamino, 25 Litchfield Ter., Brockton, Mass. 02402; Ronald E. Poore, Whitman, Mass.

[73] Assignee: Michael J. Benjamino, Brockton, Mass.

[21] Appl. No.: 760,734

[22] Filed: Sep. 16, 1991

[51] Int. Cl.⁵ .................................................. E06B 1/04
[52] U.S. Cl. ........................................ 52/213; 160/215; 135/117
[58] Field of Search ............................ 52/213–217, 52/656, 70, 63; 49/55; 160/135, 351, 215, 217, 105, 40, 46; 135/114, 117, 118, 91, 93

[56] References Cited

U.S. PATENT DOCUMENTS

| 112,590 | 3/1871 | Hancock . | |
| 148,559 | 3/1874 | Hancock . | |
| 355,969 | 1/1887 | Boughton . | |
| 374,187 | 12/1887 | Hughes | 49/55 X |
| 957,906 | 5/1910 | Ried . | |
| 1,067,306 | 7/1913 | Charron et al. . | |
| 1,074,153 | 9/1913 | Zimmerman . | |
| 1,721,198 | 7/1929 | Athey | 52/70 X |
| 2,345,886 | 4/1944 | Rick | 160/215 X |
| 2,545,535 | 3/1951 | Trombley . | |
| 2,771,133 | 11/1956 | Haskell | 160/215 X |
| 3,241,273 | 3/1966 | Struben | 52/63 |
| 3,513,862 | 5/1970 | Pohl et al. . | |
| 3,654,734 | 4/1972 | Lehman | 52/213 X |
| 4,436,135 | 3/1984 | Ytter | 160/135 |
| 4,635,418 | 1/1987 | Hobgood | 160/135 X |
| 4,640,061 | 2/1987 | Trumley | 52/656 X |
| 5,038,538 | 8/1991 | Rozon | 52/213 |
| 5,048,587 | 9/1991 | York | 160/105 X |

FOREIGN PATENT DOCUMENTS

311089 5/1929 United Kingdom .................. 52/70

Primary Examiner—Richard E. Chilcot, Jr.
Assistant Examiner—Lan M. Mai
Attorney, Agent, or Firm—John A. Haug

[57] ABSTRACT

A screen door entry system particularly useful for camper accessory screen enclosures is shown which is conveniently foldable for transporting and stowing when not in use. The entry system includes adjustable elements to engage with a camper canopy roller bar having different pitch angles for desired drainage, a door which is convertible between a single door and a Dutch door type, and anchor elements which are adapted to anchor the entry system at a selected location. The entry system in its folded condition is receivable in a carrying case for safe transporting and stowing.

10 Claims, 7 Drawing Sheets

SCREEN DOOR ENTRY SYSTEM

BACKGROUND OF THE INVENTION

This invention relates generally to screen doors and mounting means therefor and more particularly to foldable screen door systems particularly useful with screen enclosures for campers and the like.

Screen enclosures for use with campers and the like are currently in wide use however the entry systems available for use with such enclosures are unsatisfactory. One such system employs a floor to ceiling zipper through which passage is difficult for children and less agile individuals. The zipper system is also inconvenient to open, pass through and reclose for those who are carrying articles. Further, due to such difficulty the entry remains open longer than for ordinary doors and the longer the opening is uncovered the more insects will find their way into the enclosure thereby defeating the enclosure's usefulness.

Although it has been proposed to use a knock-down frame detachably connected to a tent wall opening and to pivotably mount a door to the frame this involves the assembly and disassembly of a number of component parts each time the tent or other enclosure is moved with the concomitant problems of securely and safely stowing the separate parts. Further, an excessive amount of time is required to sort out the parts, particularly if the parts have been in storage for a fairly long period of time, e.g. over the winter season, and to figure out how the parts are supposed to be assembled. Another problem with this system is that in disassembling the system and stowing the separate parts there is a danger of losing one or more components which could easily render the system useless until a replacement part can be obtained.

It is an object of the present invention to provide an entry system which overcomes the disadvantages of prior art systems mentioned above, one which is easy to set up, use, remove and stow.

The above and other objects, advantages and features of this invention will be more fully understood when considered in conjunction with the following detailed description and drawings.

SUMMARY OF THE INVENTION

Briefly, in accordance with the invention, a permanently interconnected, foldable screen door system comprises closure side upper and lower vertical door frame supports hingedly connected together along with hinge side upper and lower vertical door frame supports hingedly connected together. The upper vertical door frame supports are interconnected at their upper ends by a horizontal upper door frame stabilizer element and the lower door frame supports are interconnected at their lower ends by a horizontal lower door frame stabilizer element. The vertical supports are lockable in the extended position. An upper door section is hingedly connected to the hinge side upper vertical door frame support and a lower door section is hingedly connected to the hinge side lower vertical door frame support. The entry system is provided with means to detachably interconnect it with a screen enclosure. According to a feature of the invention the upper door section is selectively lockable to the lower door section and a shelf is selectively mounted on the top of the lower door section to provide a Dutch door option. According to another feature of the invention stake supports extend from the door frame supports to improve the stability of the system and are hingedly connected so as to fold out of the way for storage. According to another feature of the invention vertical adjustment means are provided to extend the effective height of the system within a selected range as well as to provide a selected angular pitch for effective drainage of a mating canopy. According to yet another feature a carrying case is provided having rigid lower and upstanding wall portions adapted to receive therein the entry system in a folded condition and to protect the system from damage during storage and transportation.

DESCRIPTION OF PREFERRED EMBODIMENT

Figure 1:
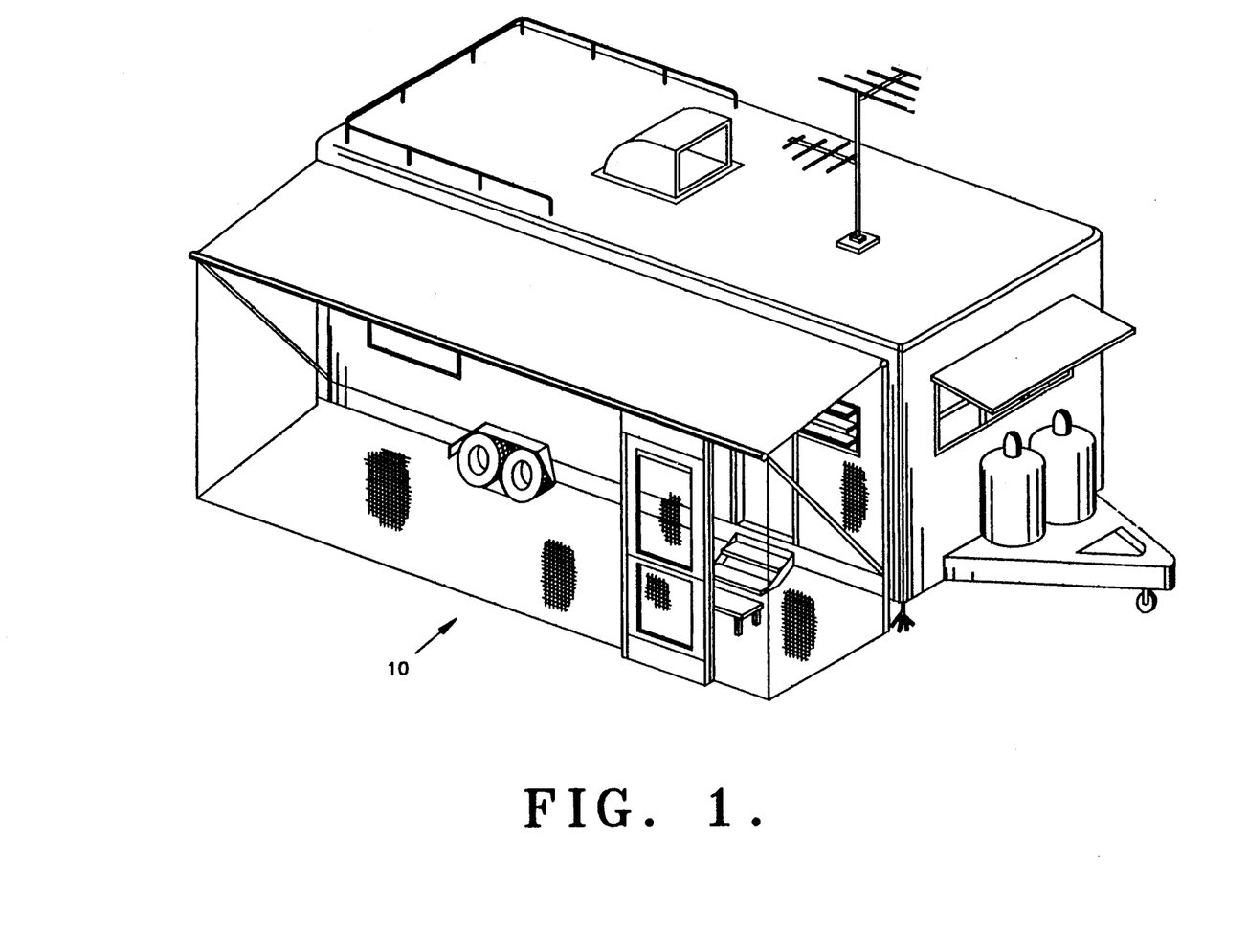
FIG. 1 is a perspective view of a camper having a screen enclosure with a screen door entry system made in accordance with the invention.

With reference to FIG. 1 numeral 10 shows the screen door entry system in its assembled, extended condition as used with a typical screen enclosure attached to a camper.

Figure 2:
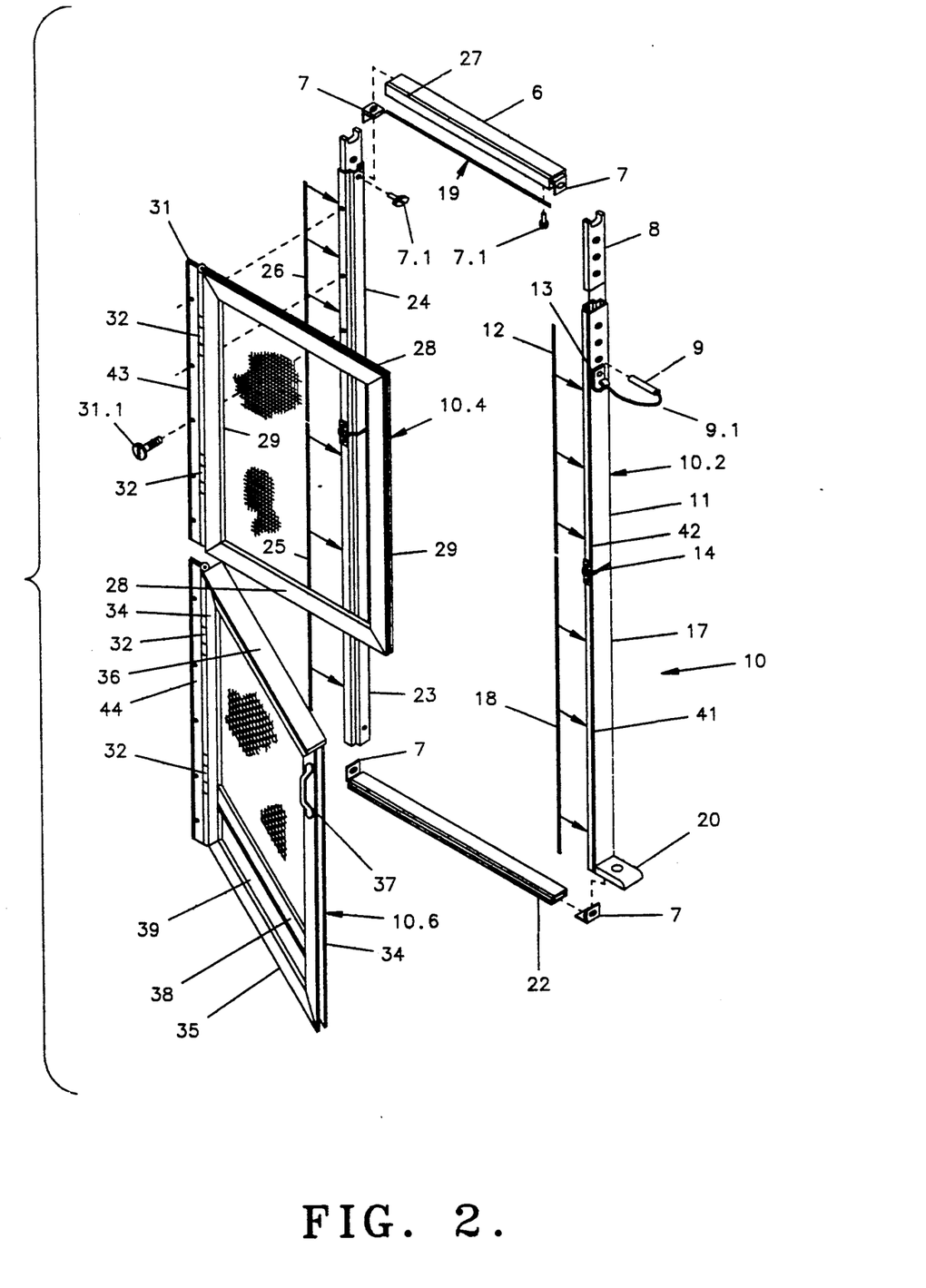
FIG. 2 is a blown apart perspective view of the door entry system shown in FIG. 1.

As best seen in FIG. 2 the screen door entry system comprises a frame 10.2 including closure side upper and lower vertical door frame supports 11 and 17 respectively, hinge side upper and lower door frame supports 24 and 23 respectively, and upper and lower door frame stabilizer elements 6 and 22 respectively, extending between the vertical supports. Upper door frame stabilizer 6 is connected to closure side upper door frame support 11 by an L-shaped door frame connector 7 one leg of which is received in an open end of stabilizer 6 and is fixed thereto with a screw 7.1 and a second leg of which is received in an open end of support 11 and is fixed thereto with a screw (not shown). The other end of stabilizer 6 is held to hinge side upper door frame support 24 by another L-shaped door frame connector 7 one leg of which is received in an open end of stabilizer 6 and is fixed thereto with a screw (not shown), and a second leg of which is received in an open end of hinge side upper door frame support 24 and is held thereto with a screw 7.1. A felt strip 19 is adhered, as by glue, to the lower surface or closure area of stabilizer element 6. A felt strip 12 is similarly adhered to the closure or inside surface of support 11. Hook material 42 is adhered along the outer edge of support 11 and serves to interconnect with screen house loop material (not shown). Felt material 26 is similarly adhered to support 24. Hook material 27 is adhered to upper face surface of stabilizer 6 so that a door to canopy insect shield 49, to be discussed below, can be added.

Lower door frame stabilizer 22 is attached to hinge side lower door support 23 by L-shaped door frame connector 7 having a leg which is received in an open end of stabilizer 22 and is held secure with a screw (not shown) and a second leg which is received in an open end of hinge side lower door frame support 23 and is held with a screw (not shown). The opposite end of lower door frame stabilizer 22 is connected to closure side lower door frame support 17 by L-shaped door frame connector 7 having a leg which is received in an open end of lower door frame stabilizer 22 and is fixed thereto with a screw (not shown) and another leg which is received in an open end of closure side lower door frame support 17 and is fixed thereto with a screw (not shown). A felt strip 18 is adhered to the door closure surface of closure side lower door support 17. Hook material 41 is adhered along the outer edge of the front face surface of support 17 and serves to complete the closure between door system 10 and a screen house on that side. Felt strip 25 is placed along the outer edge of the front face surface of hinge side lower door frame support 23.

Figure 2A:
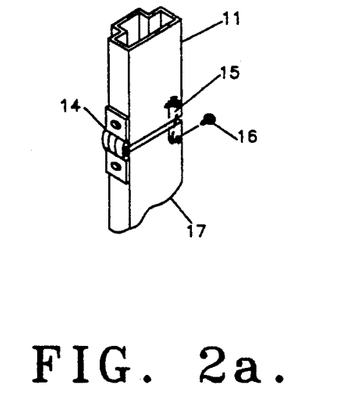
FIG. 2a is a broken away perspective view of a hinge and lock mechanism used with the vertical door frame supports.

FIG. 2a shows the means by which the door frame is held rigid in its extended position when in use and the means by which the frame folds onto itself for storage. Closure side upper door frame support 11 is attached to closure side lower frame support 17 on their front surfaces by frame folding hinge 14 that allows the door system 10 to be folded for storage. Frame rigidity S-hook 15 is disposed on the opposite back surface of closure side upper frame support 11 as by pop riveting in place. A threaded hole is disposed in the upper portion of opposite back side of closure side lower door frame support 17 that accepts an S-hook thumb screw 16. When frame rigidity S-hook 15 and S-hook thumb screw 16 are engaged frame rigidity is maintained.

Figure 3:
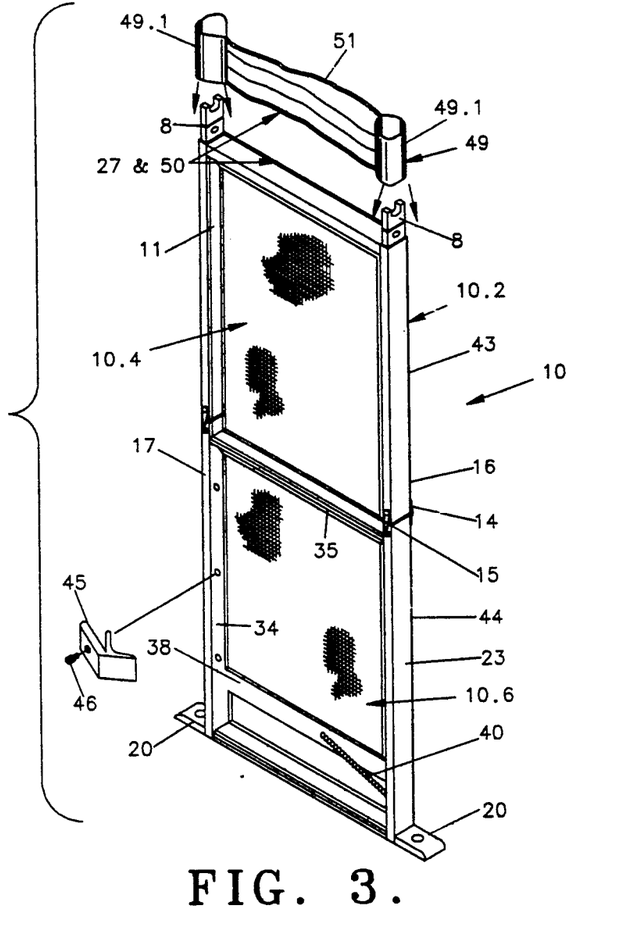
FIG. 3 is a perspective view of the FIG. 1 door system taken from the rear (from inside the enclosure) and shown with an insect shield ready for attachment.

As seen in FIG. 3, the lower distal portion of the front side of the hinge side upper door frame support 24 is attached to the upper distal portion of hinge side lower door frame support 23 by frame folding hinge 14 that allows door system 10 to be folded for storage. On the opposite back side of hinge side upper door frame support 24 frame rigidifying S-hook 15 is mounted as by being pop rivited in place. The upper distal back side portion of frame support 23 is provided with a threaded bore which accepts S-hook thumb screw 16. When frame rigidity S-hook 15 and S-hook thumb screw 16 are engaged frame rigidity is maintained.

Upper door assembly 10.4 comprises two upper door horizontal members 28 and two upper door vertical members 29 all of which have miter cut end portions and four L-shaped door section connectors 30 and associated screws.

Figure 2B:
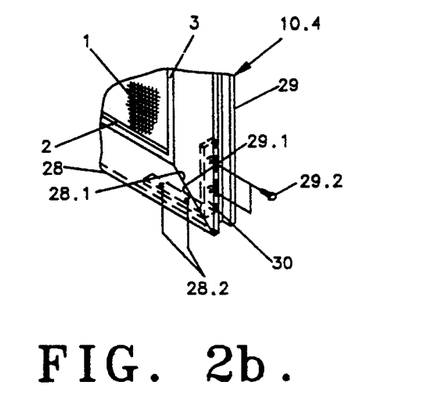
FIG. 2b is a broken away perspective view of a corner of a door section.

All four corners of door assembly 10.4 are constructed in the same manner, one such corner being shown in FIG. 2b. The hollow miter configured end 28.1 of upper door horizontal member 28 is joined to the hollow miter configured end 29.1 of upper door vertical member 29 by inserting a respective opposite end of L-shaped door section connector 30 in each. One end of L-shaped connector 30 goes into miter end 28.1 and is held with screws from the side as indicated at 28.2. The other end of L-shaped connector 30 goes into miter end 29.1 and is held with screws 29.2 from the side.

With reference to FIG. 2, hinge assembly 32 is connected to upper door assembly 10.4. Upper door to frame strip connector 31 is attached to hinge assembly 32 and the entire assembly is attached to hinge side upper door frame support 24 by screws 31.1, one of which is shown in FIG. 2. Hook material 43 is adhered to connector 31 in order to enable the attachment of a screen enclosure to the door system 10 on this side.

Lower door assembly 10.6 is slightly more complex since the lower door serves additional functions. Lower door vertical members 34 having miter cut end portions are connected to two lower door horizontal members 35 having similar miter cut end portions using four L-shaped door section connectors 30 and associated screws (not shown) in the same manner as in the upper door assembly.

Figure 2C:
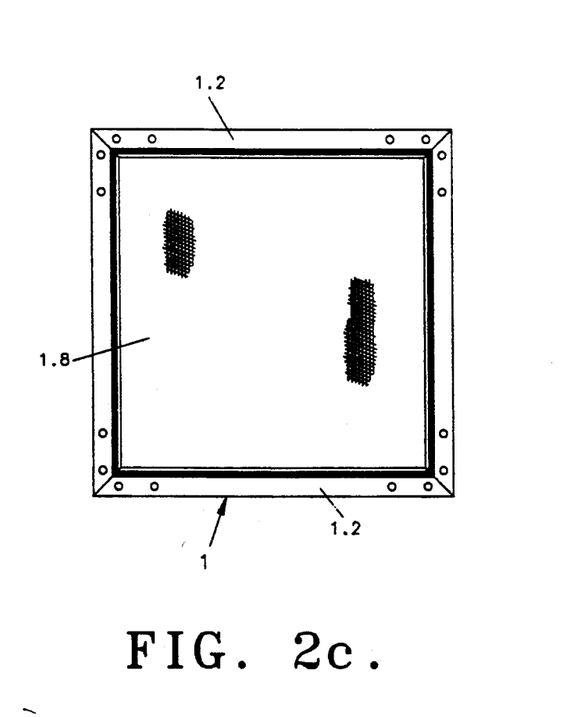
FIG. 2c is a front view of a screen insert.
Figure 2D:
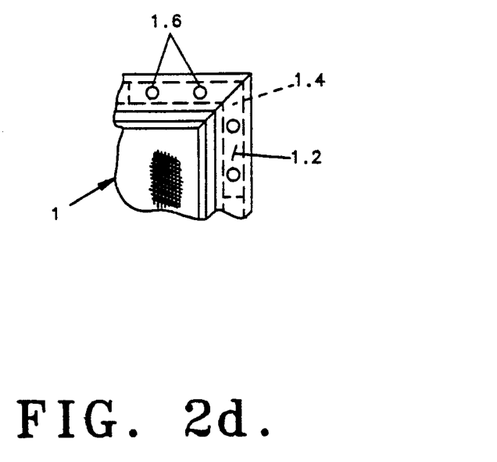
FIG. 2d is a broken away front view of a corner of the FIG. 2c insert.
Figure 2E:
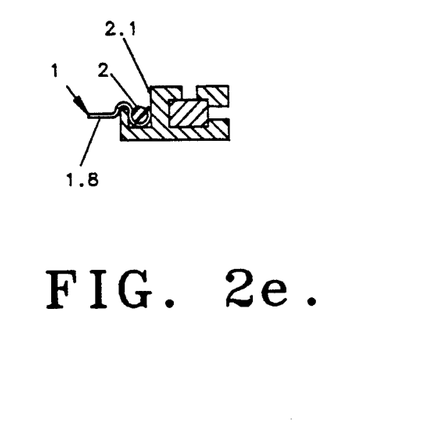
FIG. 2e is a cross section of a portion of FIG. 2d.
Figure 2F:
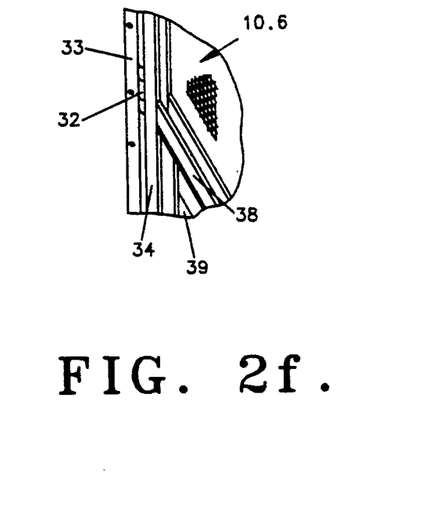
FIG. 2f is a broken away perspective view of a hinge and lower door frame section.

FIG. 2f shows a portion of the kickplate screen area on lower door assembly 10.6. Kick plate 39 is disposed on lower door horizontal member 35 and extends between the two lower door vertical member 34. A kick plate and lower door screen retainer 38 is grooved on the bottom and is disposed with kick plate 39 received inside the groove. Kick plate and lower door screen retainer 38 extends between the two lower door vertical members 34 and is held in place by screws (not shown) in each end.

With reference to FIG. 3 the top lower door horizontal member 35, the left lower door vertical member 34, the right lower door vertical member 34 and the kick plate and lower door screen retainer 38 are each fitted with screen retainers 45 and screen retainer thumb screws 46 (one of which is shown) to allow the lower door assembly to retain a screen insert. Retainers 45 and thumb screw 46 are also used with the horizontal and vertical members 28, 29 of upper door assembly 10.4 to retain a screen insert 1 as shown in FIG. 2c. Screen insert 1 comprises miter formed frame rail members 1.2 connected together by L-shaped screen frame inserts 1.4 dimpled pressed together at 1.6. It will be understood that the insert may be square or that it could be configured with different height and width dimensions as desired. Screen material 1.8 is received over the top of the screen frame and is fastened thereto by means of a rubber spline 2 pressed onto the screen and into groove 2.1 in the frame as shown in FIG. 2e. The screen insert 1 fits into the upper and lower door frame assemblies which are made with a beveled area on interior surfaces. The lower portions of the upper and lower door assemblies are made with an outer lip to seat the lower portions of insert 1 which is nested against the bevel on the other three surfaces. The screen insert is then held in place by retainers 45 and screws 46.

Hinge assembly 32 is attached to lower door assembly 10.6 and held in position with screws (not shown). Lower door to frame connector 33 is added to the hinge assembly and held in position with hinge pins (not shown). The completed lower door assembly is then connected to hinge side lower door frame support 23 by screws (not shown). Hook material 44 is adhered to lower door to frame connector 33 so that this side of a screen house will be insect free. A Dutch door shelf 36 is disposed on top of the upper horizontal member 35 of door assembly 10.6 and is held in position with screws (not shown). Door handle 37 is attached to door assembly 10.6 with appropriate screws (not shown).

Figure 3A:
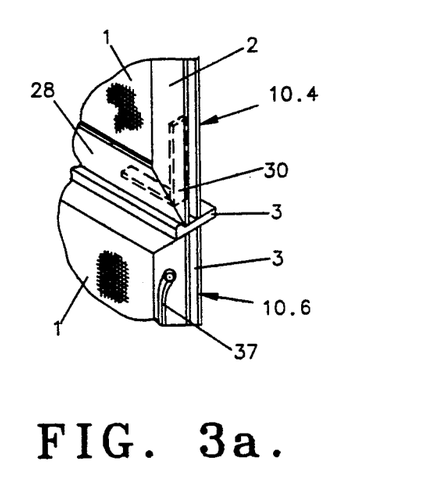
FIG. 3a is a broken away perspective view from the front of a portion of the closure side of the door sections with the door sections connected together as a unitary member.
Figure 3B:
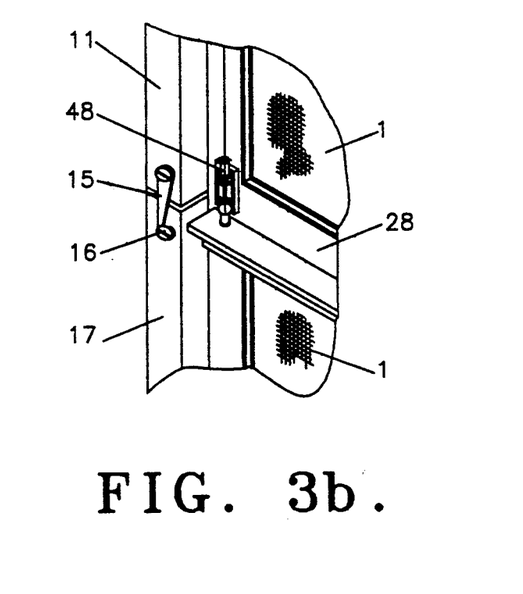
FIG. 3b is a broken away perspective view similar to FIG. 3 but seen from the rear.

FIG. 3a shows a portion of upper door assembly 10.4 and lower door assembly 10.6 as a normal unitary door from the handle side of the door. FIG. 3b shows the opposite side of FIG. 3a with frame rigidifying S-hook 15 locking upper vertical support 11 to lower vertical support 17 by use of thumb screw 16 received in a threaded bore in support 17. Thumb latch 48 is attached to the closure side of upper door assembly 10.4 (bottom portion) and is receivable in a bore formed in Dutch door shelf 36. The thumb latch 48 feature allows the user to choose when the door will be used as a normal unitary door or as a Dutch door and serves to rigidify the upper door assembly to the lower door assembly.

Figure 3C:
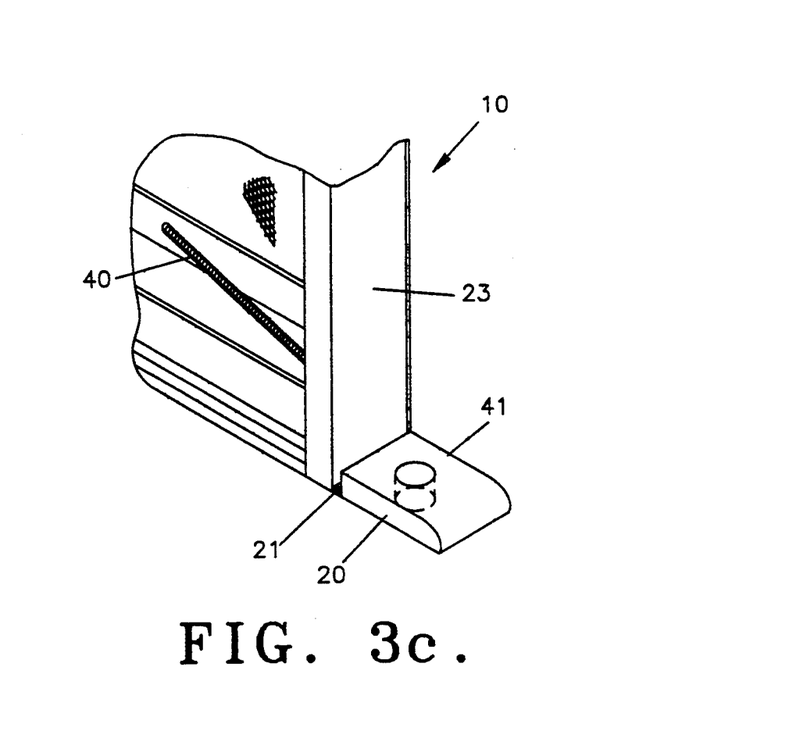
FIG. 3c is a broken away perspective view of a portion of the hinge side of the lower door section and lower vertical door frame support.

FIG. 3c shows the lower inside portion of door system 10. A door return spring 40 is attached to the inside of hinge side lower vertical door frame support 23 by a screw (not shown) that passes through an end of door return spring 40 and into support 23. The other end of door return spring 40 is attached to retainer 38 by a screw (not shown) which passes through an end of door return spring 40 and into the retainer 38. Spring 40 serves to return the door to the closed position automatically.

Figure 2G:
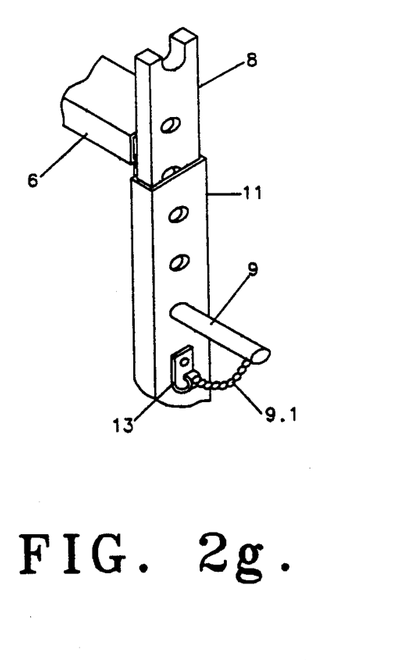
FIG. 2g is a broken away perspective view of one of the height adjustment mechanisms.

FIG. 2g shows a portion of a canopy height and angle adjustment means. A canopy height and angle adjuster element 8 having an upwardly concave, generally U-shaped surface at its upper distal end adapted to serve as a roller bar holder or interconnection surface, slides into a hollow upper distal end of closure side upper vertical door frame support 11. A drop stop and pin and chain retainer 13 has a dual function of serving as a stop so that the adjuster element 8 cannot fall through support 11 and further serves to hold canopy adjuster element pin retaining chain 9.1 that holds canopy adjuster pin 9.

As seen in FIG. 3 another canopy height and angle adjuster element 8 is received in hinge side upper vertical door frame support 24. Another canopy adjuster drop stop and chain retainer (not shown) attaches to support 24 and has the same function. Thus, as seen in FIG. 1, the canopy roller bar is interconnected to the door entry system through elements 8 which serve as supports for the roller bar. Adjustment elements 8 are individually adjustable to provide a selected pitch so that the canopy can provide proper drainage.

Figure 2H:
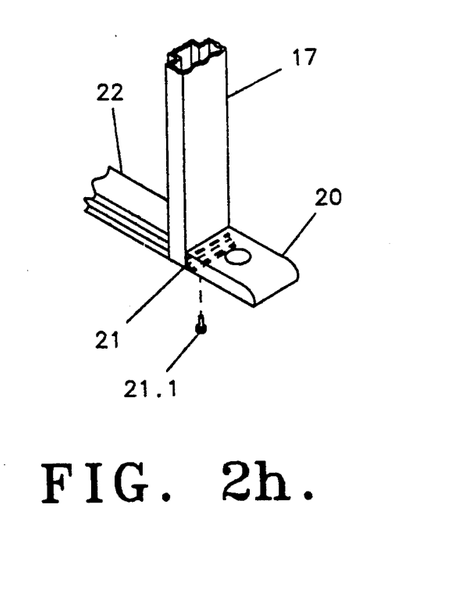
FIG. 2h is a broken away perpective view of one of the stake supports showing its connection to a door frame.

FIG. 2h shows a ground stake support assembly. Closure side lower vertical door frame support 17 has a ground stake support 20 attached to it by ground stake support hinge 21 using screws 21.1 that allows ground stake support hinge 20 to fold under lower door frame stabilizer 22 for storage.

FIG. 3c shows hinge side lower door frame support 23 with a ground stake support 20 attached to it by another ground stake support hinge 21 which again allows support 20 to fold under lower door frame stabilizer 22 for storage. Each ground stake support 20 has a bore formed through it to accept a ground stake (not shown) so that when the supports are extended stakes can be driven through the bores and into the ground to provide enhanced stability.

FIG. 3 shows the inside portion of door system 10 fully assembled and in operational position. Door to canopy insect shield 49, having first and second loops 49.1 at opposite ends thereof, is placed over respective canopy height and angle adjuster elements 8 by inserting canopy height adjuster elements 8 through respective loops 49.1. Door to canopy insect shield 49 is held to upper door frame stabilizer 6 by loop material 50 sewn on shield 49 engaging hook material 27 attached to upper door frame stabilizer 6. Insect shield 49 is then attached to a canopy roll bar by loop material 51 which is sewn to insect shield 49 engaging hook material (not shown) that is adhered to the canopy roll bar as well as vertically extending strips of hook material (not shown) on opposite outside front portions of shield 49. This will maintain an effective barrier to insects at the top and between the shield and the canopy bar and complete closure between the screen house and the door system.

An insect free environment is complete with the addition of loop material (not shown) adhered to the opening sides of the canopy screen house and the loop material brought into contact with the hook material on either side of the door.

Figure 4:
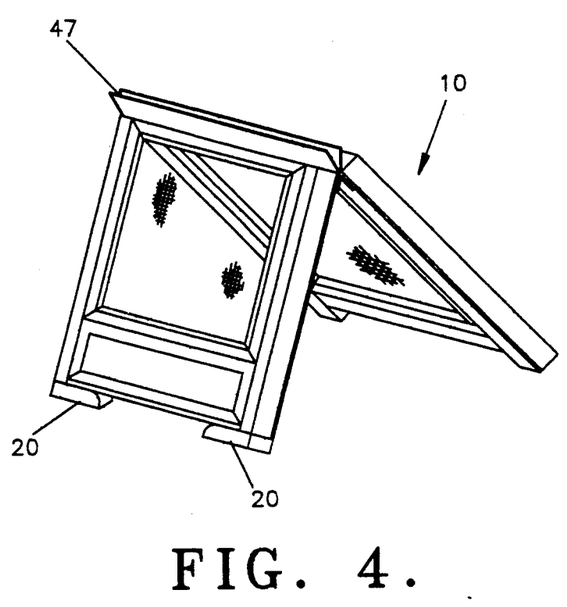
FIG. 4 is a perspective view of the door system partially folded.

When the door system is not in use it can be conveniently folded with all of its main components still interconnected. FIG. 4 shows the system partially folded with ground stake supports folded under stabilizer 22. FIG. 4 also shows a V-type weather strip gasket 47 attached to the underside of horizontal member 28 of the upper door section to serve as an insect barrier in cooperation with the Dutch door shelf.

Figure 5:
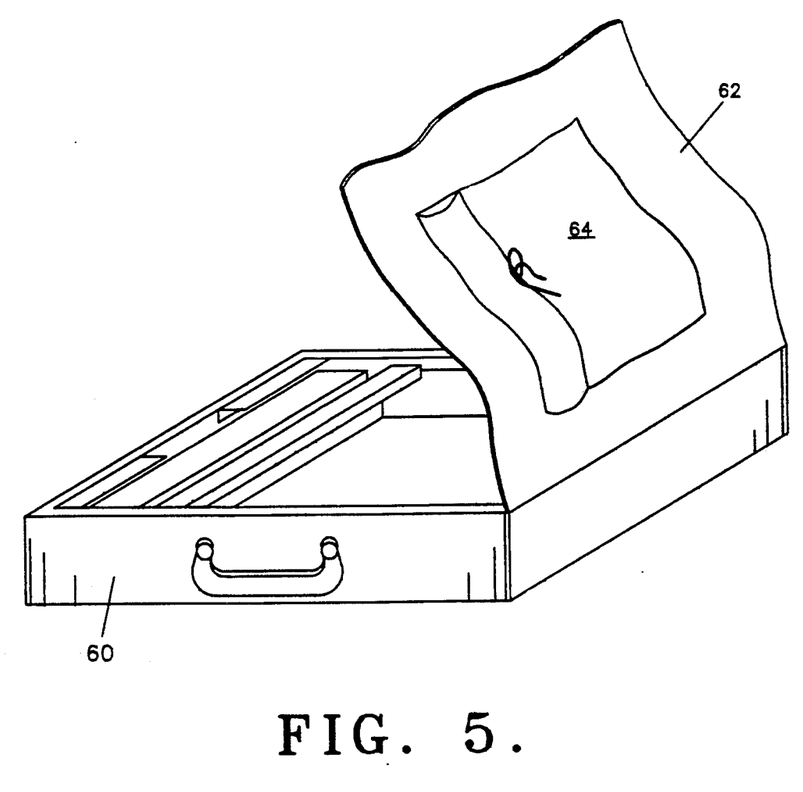
FIG. 5 is a perspective view of a carrying case in which is received a door entry system in its folded condition.

FIG. 5 shows a carrying case, generally a parallelepiped having rigid bottom and upstanding side walls with a soft cover 62 received on the side walls, to conveniently and safely store and transport the system. A pouch 64 is preferably attached to cover 62 to store the insect shield, stakes, thumb screws and the like.

It will be seen from the above that the door entry system of the present invention provides easy set-up, removal, storage and transportation due to the fact that all parts of the screen door are permanently interconnected and that the system folds onto itself. The door is stabilized by stakes placed into the ground and by special adjustable canopy roller bar supports or holders. The height of the adjustable canopy roller bar holders are adjusted individually to allow for a forward and lateral pitch of the canopy in order to maximize water drainage and minimize potential damage to canopy material. As a matter of course it is conventional to leave one corner of a canopy lower than another so that water does not puddle and create weight problems and concomitant damage. The system also provides a canopy inspect shield of canvas or similar material that is placed between the top of the door and the canopy roller bar to keep out insects, as well as a fastening system to attach the sides of the screen house to the door system in order to maintain an insect free environment.

With the exception of a hammer to drive the stakes there are no tools required to either set up or take down the screen door system since all connections and adjustments are made with thumb screws and other user friendly devices described herein. All closures between the door system, the screen house and the canopy are effected with hook and loop fasteners. The material used in the manufacture of this system can be extruded and injection molded aluminum, other metal or vinyl, but also may be made of wood utilizing conventional carpentry techniques.

The design of the door system allows the door to function as a normal door or as a Dutch door when desired by allowing the opening of the top half while keeping the bottom half closed. The Dutch door shelf also adds to the usefulness of the door for serving purposes.

The invention serves to make campers equiped with canopy attached screen houses more functional by integrating the camper, the screen house and the outside world in a way that is user friendly to all potential users and by allowing total access to all these components of camping while still providing as close to an insect free environment as would be provided by a normal house. Since screen houses are used for eating, gathering, entertaining and the like ease of access brings greater functional ability to the camper.

Like numerals designate like components through the drawings. The above description and the accompanying drawings are merely illustrative of the application of the principles of the invention and are not intended to be limiting. For example, even though the invention has particular utility with screen enclosures associated with campers it may also be used with other enclosures such as tents and the like. Numerous other arrangements which employ the principles of the invention and which fall within its spirit and scope may readily be devised by those skilled in the art. Accordingly, the invention should not be limited by the foregoing description but only by the scope of the appended claims.

We claim:

1. A permanently interconnected, foldable screen door entry system for use with camper attached canopy screen enclosures comprising:
    closure side upper and lower vertical door frame supports having respective upper and lower distal portions,
    hinge side upper and lower vertical door frame supports having respective upper and lower distal portions,
    hinge means respectively coupling the lower distal portion of the upper and the upper distal portion of the lower closure and hinge side supports together so that the upper supports can be folded from an extended position to a folded position onto the lower supports,
    locking means to lock the upper and lower supports in the extended position,
    an upper door frame stabilizer element fixedly interconnected with the upper distal portions of the upper supports,
    a lower door frame stabilizer element fixedly interconnected with the lower distal portions of the lower supports,
    an upper door section hingedly connected to the hinge side upper vertical door frame support,
    a lower door section hingedly connected to the hinge side lower vertical door frame support,
    means to selectively lock the upper door section to the lower door section, and
    means to detachably interconnect the door entry system to adjacent portions of a screen enclosure in which an opening is defined for reception of a door system, whereby the door entry system, when the upper and lower supports are not locked by the locking means and the upper and the lower door sections are not locked together, can be folded about the hinge means as a self contained system including the door frame supports, stabilizer elements and door sections.

2. A screen entry system according to claim 1 further including first and second stake support members hingedly connected to the lower distal portions of the lower frame supports adapted to extend laterally outwardly from the frame supports when in use and to be folded under the lower door frame stabilizer element when not in use and a bore extending through each support to receive therethrough a respective stake.

3. A screen door entry system according to claim 1 further including first and second vertical adjustment elements extending upwardly from the upper distal portion of the upper frame supports, generally U-shaped canopy roller bar interconnection surfaces formed on an upper distal portion of each of the adjustment elements and means to position the interconnection surfaces of the adjustment elements in any of a plurality of different vertical positions.

4. A screen door entry system according to claim 3 in which the upper frame supports each has a hollow upper distal portion and the vertical adjustment elements are telescopically received in respective hollow portions, a plurality of bores are formed through the vertical adjustment elements and into the hollow portions and a pin is receivalbe through selected bores.

5. A screen door entry system according to claim 4 further including stop means disposed in the hollow portions to limit downward movement of the vertical adjustment elements.

6. A screen door entry system according to claim 3 further including a flexible shield having first and second vertically extending loops, the loops received respectively over the vertical adjustment elements.

7. A screen door entry system according to claim 3 in which the vertical adjustment elements are separately adjustable to different vertical positions whereby different selected angular positions of a canopy roller bar can be accommodated.

8. A screen door entry system according to claim 1 further including a horizontal shelf disposed on the upper portion of the lower door section.

9. A screen door entry system according to claim 1 including a carrying case configured as a parallelepiped having rigid lower and upstanding wall members forming a cavity adapted to receive the door entry system in a folded condition therein and a flexible top wall received on the upstanding wall members to close the cavity.

10. A screen door entry system according to claim 9 further including a pouch formed on the flexible top wall to accommodate screen door system accessories.

* * * * *